(12) United States Patent
Bienas et al.

(10) Patent No.: US 8,879,980 B2
(45) Date of Patent: Nov. 4, 2014

(54) MOBILE RADIO COMMUNICATION DEVICES, MOBILE RADIO COMMUNICATION NETWORK DEVICES, METHODS FOR CONTROLLING A MOBILE RADIO COMMUNICATION DEVICE, AND METHODS FOR CONTROLLING A MOBILE RADIO COMMUNICATION NETWORK DEVICE

(75) Inventors: Maik Bienas, Braunschweig (DE); Markus Dominik Mueck, Unterhaching (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 778 days.

(21) Appl. No.: 13/101,209

(22) Filed: May 5, 2011

(65) Prior Publication Data
US 2012/0282961 A1    Nov. 8, 2012

(51) Int. Cl.
 H04B 1/60 (2006.01)
 H04B 17/02 (2006.01)
 H04B 7/15 (2006.01)
 H04B 7/14 (2006.01)
 H04W 24/00 (2009.01)
 H04W 40/12 (2009.01)
 H04W 88/04 (2009.01)

(52) U.S. Cl.
 CPC .............. *H04W 24/00* (2013.01); *H04W 40/12* (2013.01); *H04W 88/04* (2013.01)
 USPC ................................. 455/9; 455/11.1; 455/24

(58) Field of Classification Search
 CPC ........ H04B 7/14; H04B 7/18591; H04B 7/24; H04B 10/29; H04B 7/15507; H04W 84/047; H04W 88/04
 USPC ............................................ 455/7, 9, 11.1, 24
 See application file for complete search history.

(56) References Cited

U.S. PATENT DOCUMENTS

| | | | |
|---|---|---|---|
| 6,047,177 | A | 4/2000 | Wickman |
| 7,002,933 | B1 | 2/2006 | Poon et al. |
| 7,035,240 | B1 | 4/2006 | Balakrishnan et al. |

(Continued)

FOREIGN PATENT DOCUMENTS

| | | |
|---|---|---|
| CN | 1929384 A | 3/2007 |
| CN | 101990324 A | 3/2011 |
| DE | 102009033553 A1 | 1/2011 |
| EP | 1304012 A1 | 4/2003 |

OTHER PUBLICATIONS

English language abstract of DE 102009033553 A1 dated Jan. 20, 2011.

(Continued)

*Primary Examiner* — Andrew Wendell
(74) *Attorney, Agent, or Firm* — Schwabe, Williamson & Wyatt, P.C.

(57) ABSTRACT

In an embodiment, a mobile radio communication device may be provided. The mobile radio communication device may include a first communication interface configured to communicate with another mobile radio communication device, a second communication interface configured to communicate with a mobile radio base station, and a relay quality determiner configured to determine a quality of relaying data between the other mobile radio communication device and the mobile radio base station via the first communication interface and the second communication interface.

18 Claims, 11 Drawing Sheets

(56) References Cited

U.S. PATENT DOCUMENTS

| | | |
|---|---|---|
| 8,254,928 B2 * | 8/2012 | Watanabe et al. ............. 455/436 |
| 8,606,173 B2 * | 12/2013 | Jung et al. .......................... 455/7 |
| 2003/0162529 A1 | 8/2003 | Noblins |
| 2003/0235175 A1 | 12/2003 | Naghian et al. |
| 2004/0023652 A1 * | 2/2004 | Shah et al. ................. 455/426.2 |
| 2004/0205105 A1 * | 10/2004 | Larsson et al. ................ 709/200 |
| 2007/0002766 A1 | 1/2007 | Park et al. |
| 2007/0178831 A1 * | 8/2007 | Takeda et al. ..................... 455/7 |
| 2009/0088070 A1 | 4/2009 | Aaron |
| 2009/0183266 A1 | 7/2009 | Tan et al. |
| 2010/0027517 A1 | 2/2010 | Bonta et al. |
| 2010/0182916 A1 * | 7/2010 | Drewes et al. ................ 370/252 |
| 2010/0296475 A1 * | 11/2010 | Visotsky et al. .............. 370/329 |
| 2011/0080864 A1 * | 4/2011 | Cai et al. ....................... 370/315 |
| 2012/0282961 A1 * | 11/2012 | Bienas et al. ................. 455/507 |
| 2013/0012217 A1 * | 1/2013 | Suda ............................. 455/450 |
| 2013/0044627 A1 * | 2/2013 | Jen ................................ 370/252 |

OTHER PUBLICATIONS

Chinese Patent Office; First Office Action for Chinese Patent Application No. 201210135737.5, dated Jul. 3, 2014, 22 pages inclusive of English translation.

* cited by examiner

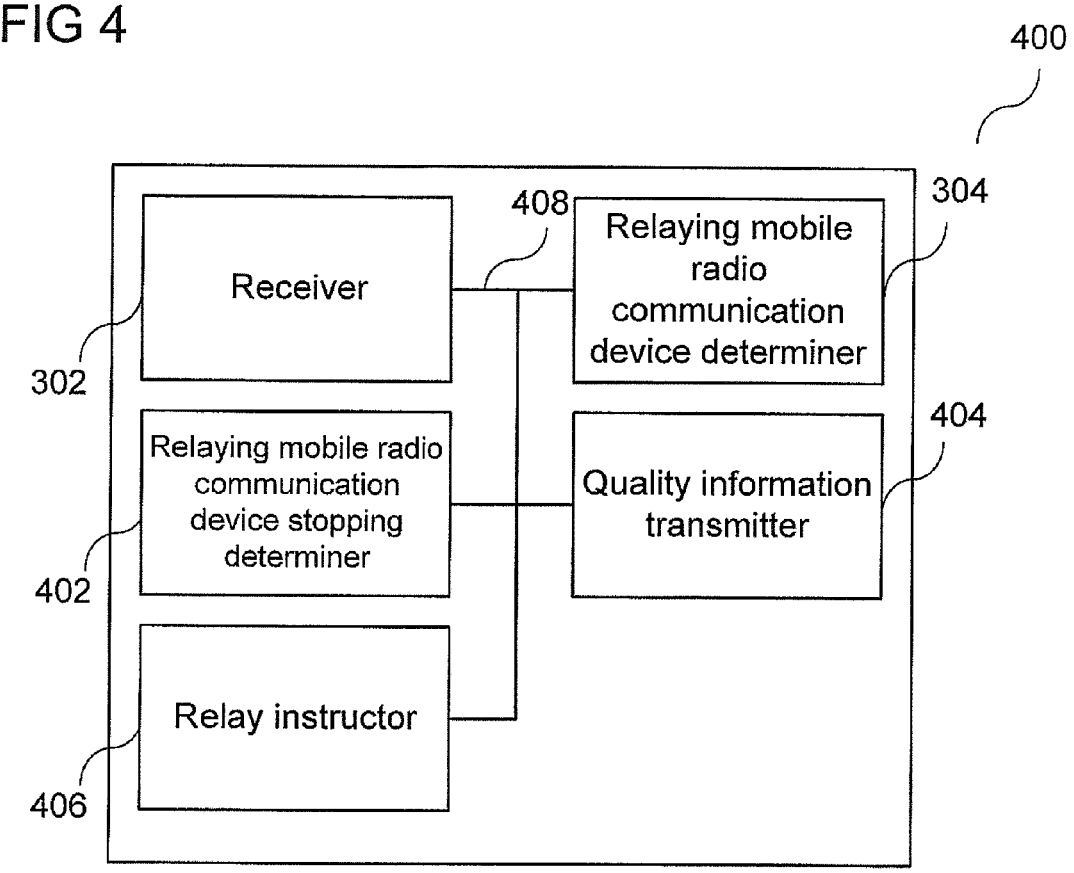

MOBILE RADIO COMMUNICATION DEVICES, MOBILE RADIO COMMUNICATION NETWORK DEVICES, METHODS FOR CONTROLLING A MOBILE RADIO COMMUNICATION DEVICE, AND METHODS FOR CONTROLLING A MOBILE RADIO COMMUNICATION NETWORK DEVICE

TECHNICAL FIELD

Embodiments relate generally to mobile radio communication devices, mobile radio communication network devices, methods for controlling a mobile radio communication device, and methods for controlling a mobile radio communication network device.

BACKGROUND

Opportunistic networks may provide access to a mobile radio communication network for mobile radio communication devices via another mobile radio communication device. For example, a first mobile radio communication device may be in communication with a second mobile radio communication device via a short range radio access technology, and the second mobile radio communication device may communicate with a mobile radio communication system via a base station, and may relay data received via short range communication from the first mobile radio communication device to the mobile radio communication system and may relay data from the mobile radio communication system to the first mobile radio communication device via short range communication. Thus, the first mobile radio communication device may communicate with the mobile radio communication system via the first mobile radio communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 4 shows a mobile radio communication network device in accordance with an embodiment;

FIG. 5 shows a flow diagram illustrating a method for controlling a mobile radio communication device in accordance with an embodiment;

DESCRIPTION

Figure 1:
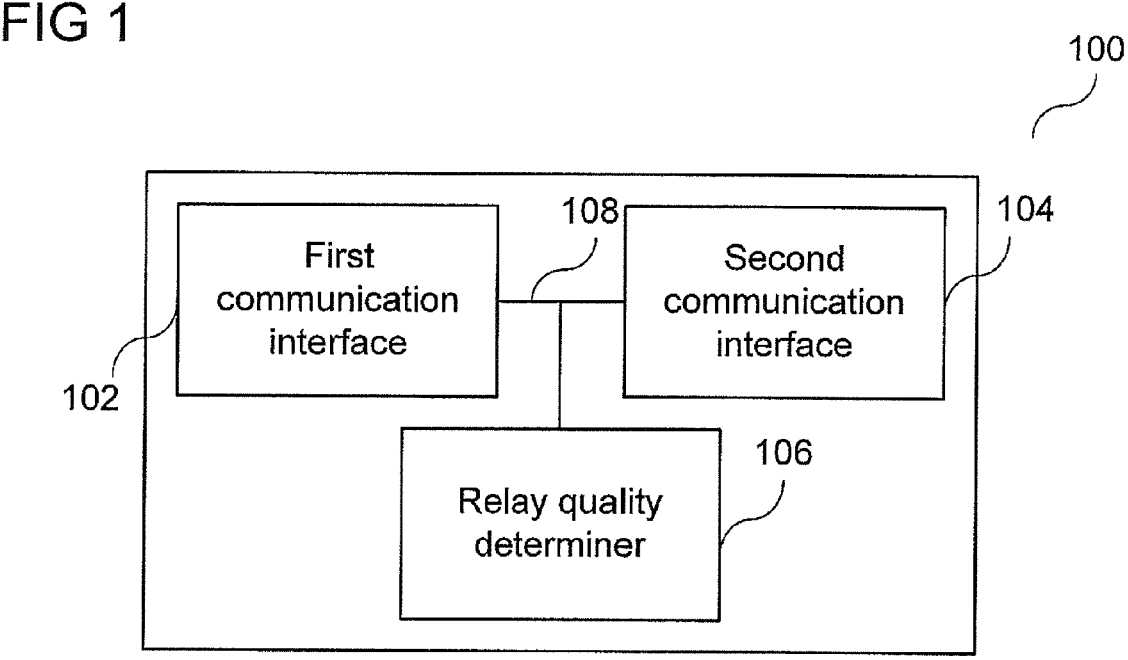
FIG. 1 shows a mobile radio communication device in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

A mobile radio communication device according to various embodiments may be a device configured for wired communication, for example a desktop computer or laptop, or for wireless communication, for example a radio communication device. In various embodiments, a radio communication device may be an end-user mobile device (MD). In various embodiments, a radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

A mobile radio communication network device may be understood as a device that is provided (for example stationary) in a mobile radio communication network. For example, the mobile radio communication network device may be or may be included in a mobile radio base station, a NodeB, an eNodeB (evolved NodeB), an MME (Mobility Management Entity), a Serving Gateway (S-GW), or a Serving GPRS (General Packet Radio Service) Support Node (SGSN).

The mobile radio communication device may include a memory which may for example be used in the processing carried out by the mobile radio communication device. The mobile radio communication network device may include a memory which may for example be used in the processing carried out by the mobile radio communication network device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific communication device may also hold for any communication device described herein. It will be understood that any property described herein for a specific method may also hold for any method described herein.

Opportunistic networks may provide access to a mobile radio communication network for mobile radio communication devices via another mobile radio communication device. For example, a first mobile radio communication device may be in communication with a second mobile radio communication device via a short range radio access technology, and the second mobile radio communication device may communicate with a mobile radio communication system via a base station, and may relay data received via short range communication from the first mobile radio communication device to the mobile radio communication system and may relay data from the mobile radio communication system to the first mobile radio communication device via short range communication. Thus, the first mobile radio communication device may communicate with the mobile radio communication system via the first mobile radio communication device. According to various embodiments, information about a quality of a mobile radio communication device as a relaying mobile radio communication device may be interchanged between the network and the mobile radio communication devices, and in case a relaying mobile radio communication device stops its relaying operation, a new relaying mobile radio communication device may start operation quickly based on this information.

FIG. 1 shows a mobile radio communication device 100 in accordance with an embodiment. The mobile radio communication device 100 may include a first communication interface 102 configured to communicate with another mobile radio communication device (not shown). The mobile radio communication device 100 may further include a second communication interface 104 configured to communicate with a mobile radio base station (not shown). The mobile radio communication device 100 may further include a relay quality determiner 106 configured to determine a quality of relaying data between the other mobile radio communication device and the mobile radio base station via the first communication interface 102 and the second communication interface 104. The first communication interface 102, the second communication interface 104, and the relay quality determiner 106 may be coupled with each other, e.g. via an electrical connection 108 such as e.g. a cable or a computer bus or via any other suitable electrical connection to exchange electrical signals.

According to various embodiments, the mobile radio communication device 100 may be included in an opportunistic network.

According to various embodiments, the first communication interface 102 may be configured according to a radio access technology on an unlicensed band.

According to various embodiments, the first communication interface 102 may be configured according to a short range radio access technology.

According to various embodiments, the first communication interface 102 may be configured according to at least one of the following mobile radio communication technologies: Bluetooth radio communication technology, an Ultra Wide Band (UWB) radio communication technology, and/or a Wireless Local Area Network (WLAN) radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput).

According to various embodiments, the second communication interface 104 may be configured according to a radio access technology on a licensed band.

According to various embodiments, the second communication interface 104 may be configured according to a cellular radio access technology.

According to various embodiments, the second communication interface 104 may be configured according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), and TD-LTE.

Figure 2:
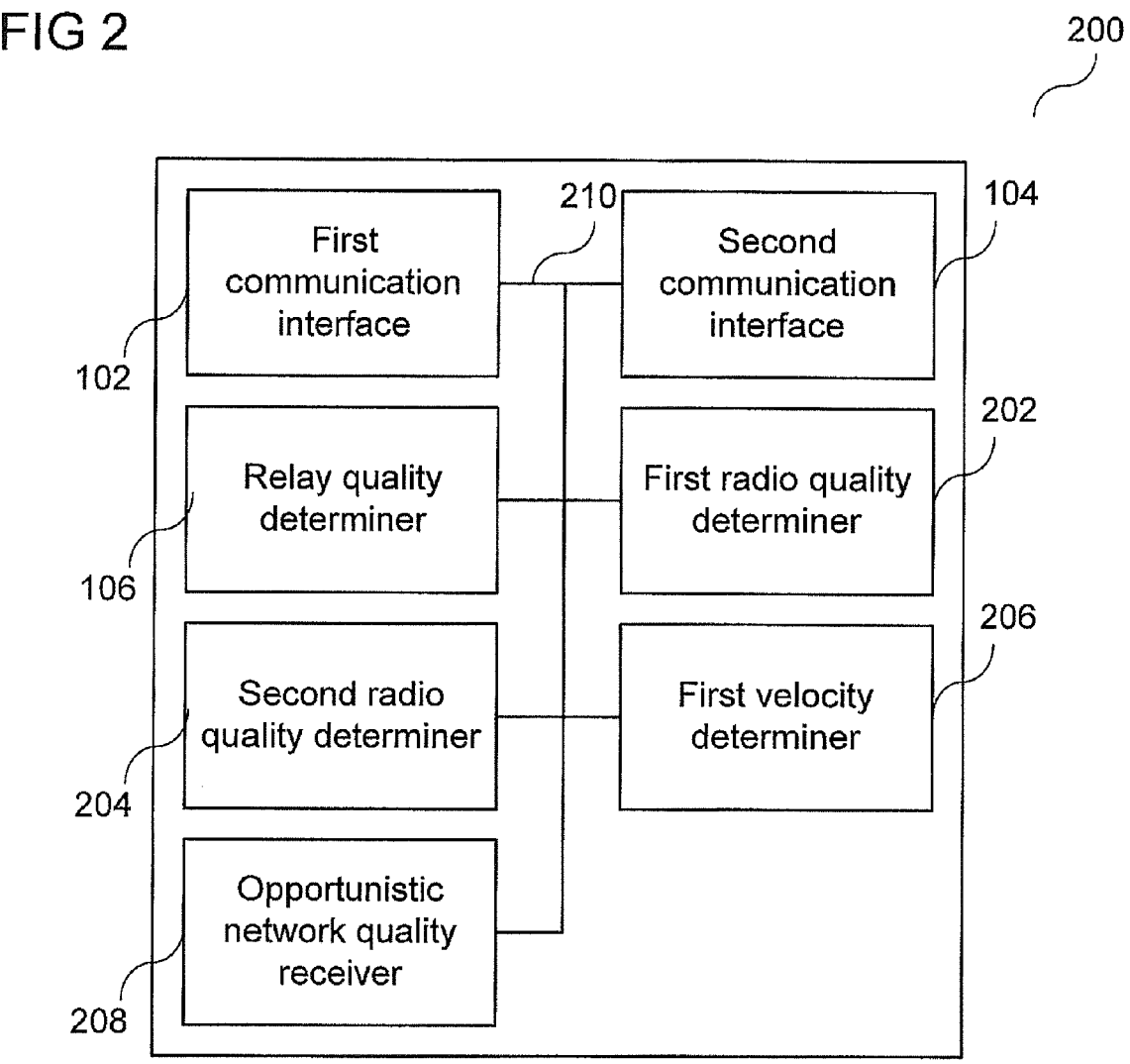
FIG. 2 shows a mobile radio communication device in accordance with an embodiment.

FIG. 2 shows a mobile radio communication device 200 in accordance with an embodiment. The mobile radio communication device 200 may, similar to the mobile radio communication device 100 shown in FIG. 1, include a first communication interface 102. The mobile radio communication device 200 may, similar to the mobile radio communication device 100 shown in FIG. 1, further include a second communication interface 104. The mobile radio communication device 200 may, similar to the mobile radio communication device 100 shown in FIG. 1, further include a relay quality determiner 106. The mobile radio communication device 200 may further include a first radio quality determiner 202, like will be described in more detail below. The mobile radio communication device 200 may further include a second radio quality determiner 204, like will be described in more detail below. The mobile radio communication device 200 may further include a first velocity determiner 206, like will be described in more detail below. The mobile radio communication device 200 may further include an opportunistic network quality receiver 208, like will be described in more detail below. The first communication interface 102, the second communication interface 104, the relay quality determiner 106, the first radio quality determiner 202, the second radio quality determiner 204, the first velocity determiner 206, and the opportunistic network quality receiver 208 may be coupled with each other, e.g. via an electrical connection 210 such as e.g. a cable or a computer bus or via any other suitable electrical connection to exchange electrical signals.

According to various embodiments, the first radio quality determiner 202 may be configured to determine a quality of radio communication via the first communication interface 102.

According to various embodiments, the relay quality determiner 106 may be further configured to determine the quality of relaying data based on the determined quality of radio communication via the first communication interface 102.

According to various embodiments, the second radio quality determiner 204 may be configured to determine a quality of radio communication via the second communication interface 104.

According to various embodiments, the relay quality determiner 106 may be further configured to determine the quality of relaying data based on the determined quality of radio communication via the second communication interface 104.

According to various embodiments, the first velocity determiner 206 may be configured to determine a velocity of the mobile radio communication device 200.

According to various embodiments, the relay quality determiner 106 may be further configured to determine the quality of relaying data based on the determined velocity of the mobile radio communication device 200.

According to various embodiments, the mobile radio communication device 200 may further include a second velocity determiner (not shown) configured to determine a velocity of the other mobile radio communication device.

According to various embodiments, the relay quality determiner 106 may further be configured to determine the quality of relaying data based on the determined velocity of the other mobile radio communication device.

According to various embodiments, the mobile radio communication device 200 may further include a relay quality information transmitter (not shown) configured to transmit to a mobile radio communication network device (not shown) information indicating the quality of relaying data.

According to various embodiments, the relay quality information transmitter may be configured to transmit the information via the first communication interface 102.

According to various embodiments, the relay quality information transmitter may be configured to transmit the information via the second communication interface 104.

According to various embodiments, the information may include or may be the determined quality of radio communication via the first communication interface 102.

According to various embodiments, the information may include or may be the determined quality of radio communication via the second communication interface 104.

According to various embodiments, the information may include or may be the determined velocity of the mobile radio communication device 200.

According to various embodiments, the information may include or may be the determined velocity of the other mobile radio communication device.

According to various embodiments, the relay quality determiner 106 may be further configured to determine a quality metrics including or being a real number indicating the quality of relaying data.

According to various embodiments, the mobile radio communication device 200 may receive relay quality information of another (or still another) mobile radio communication device. According to various embodiments, the mobile radio communication device 200 may be a non-relaying mobile radio communication device in the opportunistic network, and, in case a relaying mobile radio communication device to which the non-relaying mobile radio communication device 200 is connected stops its relaying services, may determine a new relaying mobile radio communication device based on the received relay quality information. According to various embodiments, in case it is determined that the mobile radio communication device 200 itself is to be the new relaying mobile radio communication device, the mobile radio communication device 200 may provide services as a relaying mobile radio communication device to other mobile radio communication devices.

According to various embodiments, the mobile radio communication device 200 may receive respective information from a plurality of other mobile radio communication devices, and may determine a respective quality metrics including or being a real number indicating the respective quality of relaying data, and may transmit the plurality of quality metrics to a mobile radio communication network device.

According to various embodiments, the opportunistic network quality receiver 208 may be configured to receive information indicating a respective quality of service of a plurality of opportunistic networks.

According to various embodiments, the mobile radio communication device 200 may further include a connection decider (not shown) configured to determine to which opportunistic network of the plurality of opportunistic networks to connect, based on the received information.

Figure 3:
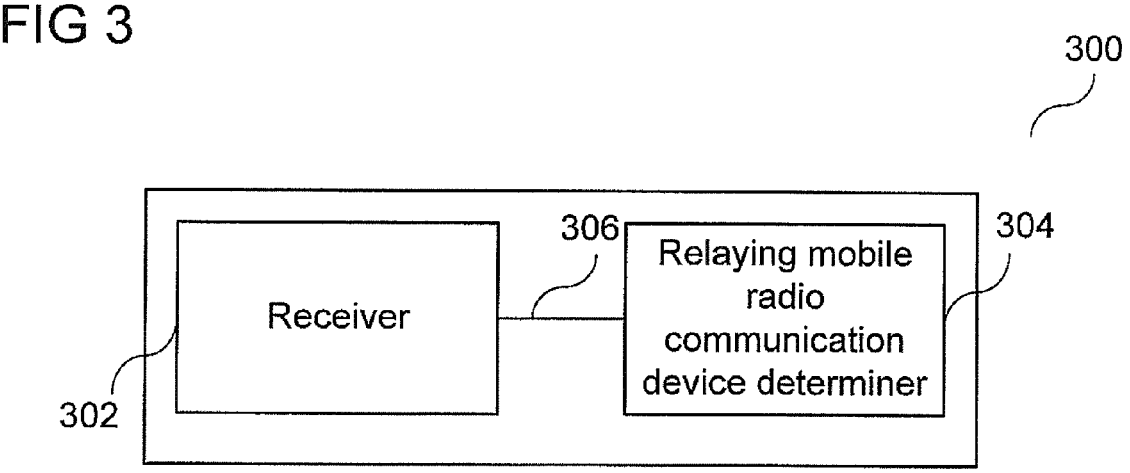
FIG. 3 shows a mobile radio communication network device in accordance with an embodiment.

FIG. 3 shows a mobile radio communication network device 300 in accordance with an embodiment. The mobile radio communication network device 300 may include a receiver 302 configured to receive relaying quality information of a first mobile radio communication device and relaying quality information of a second mobile radio communication device. The relaying quality information of the first mobile radio communication device may indicate (or may provide information for determining) a quality of relaying data via a first communication interface of the first mobile radio communication device and a second communication interface of the first mobile radio communication device. The first mobile radio communication device may be a mobile radio communication device like described with reference to FIG. 1 or FIG. 2 above. The relaying quality information of the second mobile radio communication device may indicate (or may provide information for determining) a quality of relaying data via a first communication interface of the second mobile radio communication device and a second communication interface of the second mobile radio communication device. The second mobile radio communication device may be a mobile radio communication device like described with reference to FIG. 1 or FIG. 2 above. The mobile radio communication network device 300 may further include a relaying mobile radio communication device determiner 304 configured to determine which one of the first mobile radio communication device and the second mobile radio communication device provides a higher quality of relaying data. The receiver 302 and the relaying mobile radio communication device determiner 304 may be coupled with each other, e.g. via an electrical connection 108 such as e.g. a cable or a computer bus or via any other suitable electrical connection to exchange electrical signals.

FIG. 4 shows a mobile radio communication network device 400 in accordance with an embodiment. The mobile radio communication network device 400 may, similar to the mobile radio communication network device 300 shown in FIG. 3, include a receiver 302. The mobile radio communication network device 400 may, similar to the mobile radio communication network device 300 shown in FIG. 3, include a relaying mobile radio communication device determiner 304. The mobile radio communication network device 400 may further include a relaying mobile radio communication device stopping determiner 402 configured to determine whether a relaying mobile radio communication device stops operation. The mobile radio communication network device 400 may further include a quality information transmitter 404 configured to transmit information indicating a candidate for a relaying mobile radio communication device to a plurality of mobile radio communication devices based on the determination (for example if it is determined that the relaying mobile radio communication device stopped operation as a relaying mobile radio communication device, for example stopped relaying). The mobile radio communication network device 400 may further include a relay instructor 406 configured to transmit an instruction to start operating as a relaying mobile radio communication device to a mobile radio communication device, based on the determination. The receiver 302, the relaying mobile radio communication device determiner 304, the relaying mobile radio communication device stopping determiner 402, the quality information transmitter 404, and the relay instructor 406 may be coupled with each other, e.g. via an electrical connection 108 such as e.g. a cable or a computer bus or via any other suitable electrical connection to exchange electrical signals.

According to various embodiments, the mobile radio communication network device 400 may further include an opportunistic network quality determiner (not shown) configured to determine a quality of service of an opportunistic network including the first mobile radio communication device and the second mobile radio communication device based on the relaying quality information of the first mobile radio communication device and the relaying quality information of the second mobile radio communication device.

According to various embodiments, the mobile radio communication network device 400 may further include a relay candidate determiner (not shown) configured to determine whether a mobile radio communication device is a candidate for a relaying mobile radio communication device.

According to various embodiments, the mobile radio communication network device 400 may further include a relay quality information requester (not shown) configured to request relaying quality information of the mobile radio communication device if it is determined that the mobile radio communication device is a candidate for a relaying mobile radio communication device.

FIG. 5 shows a flow diagram 500 illustrating a method for controlling a mobile radio communication device in accordance with an embodiment. In 502, a quality of relaying data between another mobile radio communication device and a mobile radio base station via a first communication interface and a second communication interface may be determined.

According to various embodiments, the first communication interface may communicate with another mobile radio communication device, for example on an unlicensed band.

According to various embodiments, the first communication interface may communicate with another mobile radio communication device, for example according to a short range radio access technology.

According to various embodiments, the first communication interface may communicate with another mobile radio communication device according to at least one of the following mobile radio communication technologies: Bluetooth radio communication technology, an Ultra Wide Band (UWB) radio communication technology, and/or a Wireless Local Area Network (WLAN) radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput).

According to various embodiments, the second communication interface may communicate with a mobile radio base station on a licensed band.

According to various embodiments, the second communication interface may communicate with a mobile radio base station, for example according to a cellular radio access technology.

According to various embodiments, the second communication interface may communicate with a mobile radio base station according to at least one of the following radio access technologies: Global System for Mobile Communications (GSM) radio communication technology, a General Packet Radio Service (GPRS) radio communication technology, an Enhanced Data Rates for GSM Evolution (EDGE) radio communication technology, FOMA (Freedom of Multimedia Access), and/or a Third Generation Partnership Project (3GPP) radio communication technology (e.g. UMTS (Universal Mobile Telecommunications System), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), LTE TDD (LTE Time Division Duplex), and TD-LTE.

According to various embodiments, a quality of radio communication via the first communication interface may be determined.

According to various embodiments, the quality of relaying data may be determined based on the determined quality of radio communication via the first communication interface.

According to various embodiments, a quality of radio communication via the second communication interface may be determined.

According to various embodiments, the quality of relaying data may be determined based on the determined quality of radio communication via the second communication interface.

According to various embodiments, a velocity of the mobile radio communication device may be determined.

According to various embodiments, the quality of relaying data may be determined based on the determined velocity of the mobile radio communication device.

According to various embodiments, a velocity of the other mobile radio communication device may be determined.

According to various embodiments, the quality of relaying data may be determined based on the determined velocity of the other mobile radio communication device.

According to various embodiments, information indicating the quality of relaying data may be transmitted to a mobile radio communication network device. According to various embodiments, the information may be transmitted via the first communication interface. According to various embodiments, the information may be transmitted via the second communication interface.

According to various embodiments, the information may include or may be the determined quality of radio communication via the first communication interface.

According to various embodiments, the information may include or may be the determined quality of radio communication via the second communication interface.

According to various embodiments, the information may include or may be the determined velocity of the mobile radio communication device.

According to various embodiments, the information may include or may be the determined velocity of the other mobile radio communication device.

According to various embodiments, a quality metrics including or being a real number indicating the quality of relaying data may be determined.

According to various embodiments, relay quality information of another (or still another) mobile radio communication device may be received. According to various embodiments, the mobile radio communication device may be a non-relaying mobile radio communication device in the opportunistic network, and, in case a relaying mobile radio communication device to which the non-relaying mobile radio communication device is connected stops its relaying services, may determine a new relaying mobile radio communication device based on the received relay quality information. According to various embodiments, in case it is determined that the mobile radio communication device itself is to be the new relaying mobile radio communication device, the mobile radio communication device may provide services as a relaying mobile radio communication device to other mobile radio communication devices.

According to various embodiments, the mobile radio communication device may receive respective information from a plurality of other mobile radio communication devices, and may determine a respective quality metrics including or being a real number indicating the respective quality of relaying data, and may transmit the plurality of quality metrics to a mobile radio communication network device.

According to various embodiments, information indicating a respective quality of service of a plurality of opportunistic networks may be received.

According to various embodiments, it may be determined to which opportunistic network of the plurality of opportunistic networks to connect, based on the received information.

Figure 6:
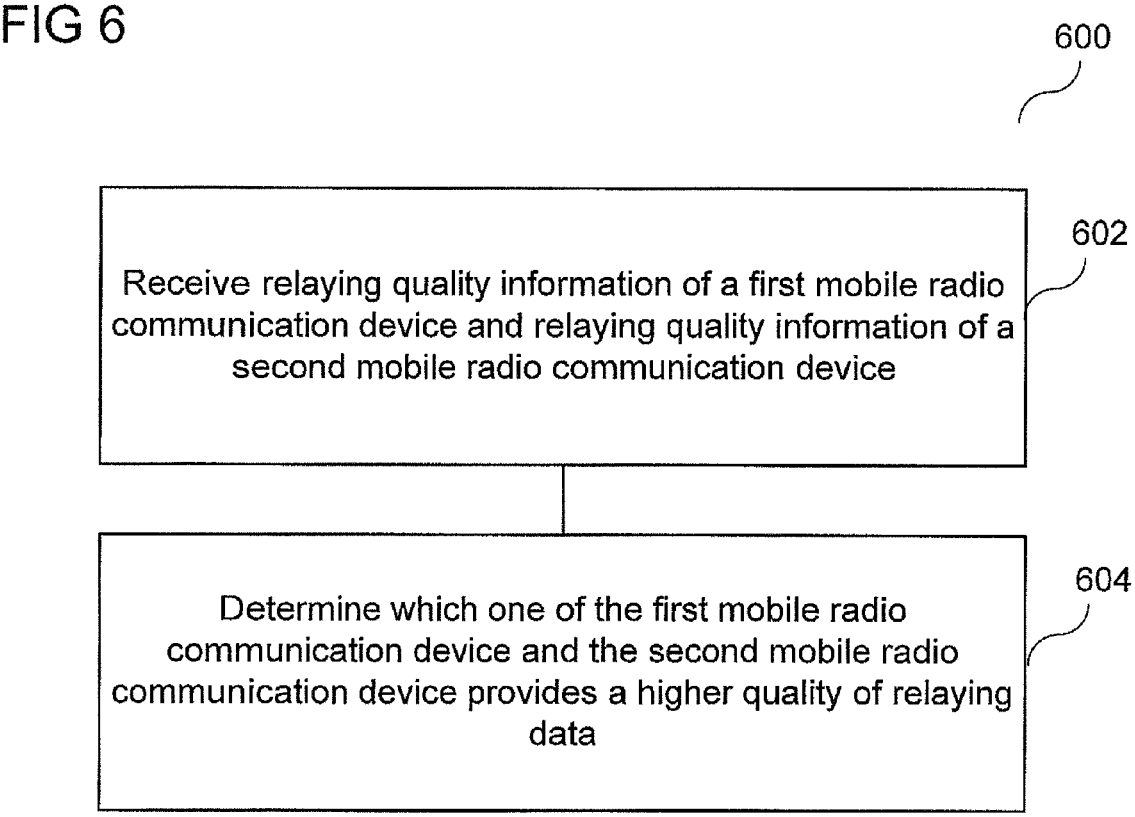
FIG. 6 shows a flow diagram illustrating a method for controlling a mobile radio communication network device in accordance with an embodiment.

FIG. 6 shows a flow diagram 600 illustrating a method for controlling a mobile radio communication network device in accordance with an embodiment. In 602, relaying quality information of a first mobile radio communication device and relaying quality information of a second mobile radio communication device may be received. The relaying quality information of the first mobile radio communication device may indicate a quality of relaying data via a first communication interface of the first mobile radio communication device and a second communication interface of the first mobile radio communication device. The relaying quality information of the second mobile radio communication device may indicate a quality of relaying data via a first communication interface of the second mobile radio communication device and a second communication interface of the second mobile radio communication device. In 604, it may be determined which one of the first mobile radio communication device and the second mobile radio communication device provides a higher quality of relaying data.

According to various embodiments, it may be determined whether a relaying mobile radio communication device stops operation.

According to various embodiments, information indicating a candidate for a relaying mobile radio communication device may be transmitted to a plurality of mobile radio communication devices based on the determination.

According to various embodiments, an instruction to start operating as a relaying mobile radio communication device may be transmitted to a mobile radio communication device, based on the determination.

According to various embodiments, a quality of service of an opportunistic network including the first mobile radio communication device and the second mobile radio communication device may be determined based on the relaying quality information of the first mobile radio communication device and the relaying quality information of the second mobile radio communication device.

According to various embodiments, it may be determined whether a mobile radio communication device is a candidate for a relaying mobile radio communication device.

According to various embodiments, relaying quality information of the mobile radio communication device may be requested if it is determined that the mobile radio communication device is a candidate for a relaying mobile radio communication device.

Figure 7:
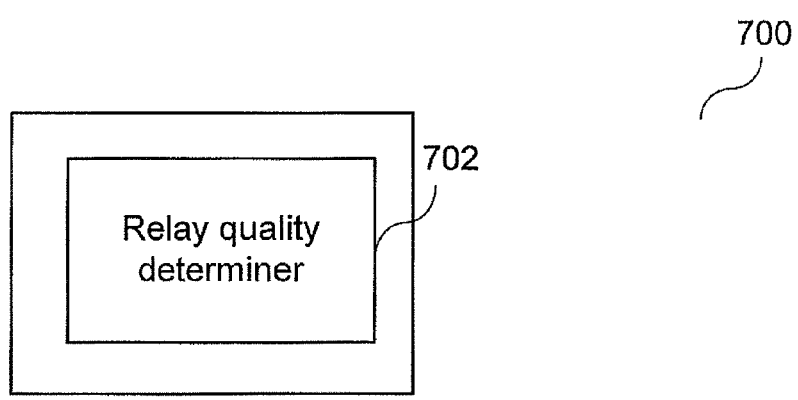
FIG. 7 shows a mobile radio communication device in accordance with an embodiment.

FIG. 7 shows a mobile radio communication device 700 in accordance with an embodiment. The mobile radio communication device 700 may include a relay quality determiner 702 configured to determine a quality of the mobile radio communication device 700 as a relay mobile radio communication device in an opportunistic network.

Figure 8:
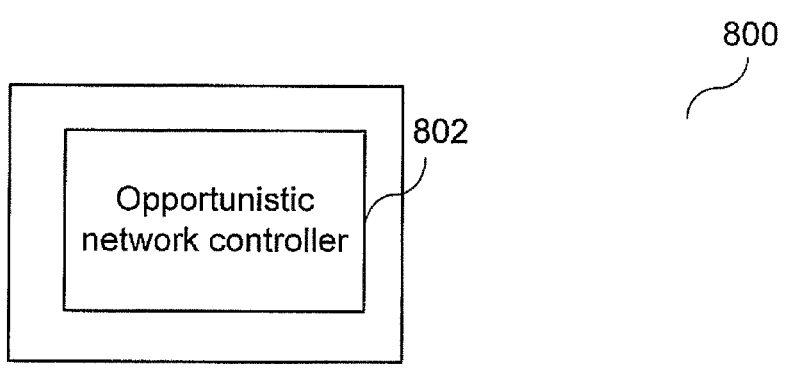
FIG. 8 shows a mobile radio communication network device in accordance with an embodiment.

FIG. 8 shows a mobile radio communication network device 800 in accordance with an embodiment. The mobile radio network device 800 may include an opportunistic network controller 802 configured to determine a relaying mobile radio communication device in an opportunistic network from a plurality of mobile radio communication devices.

Figure 9:
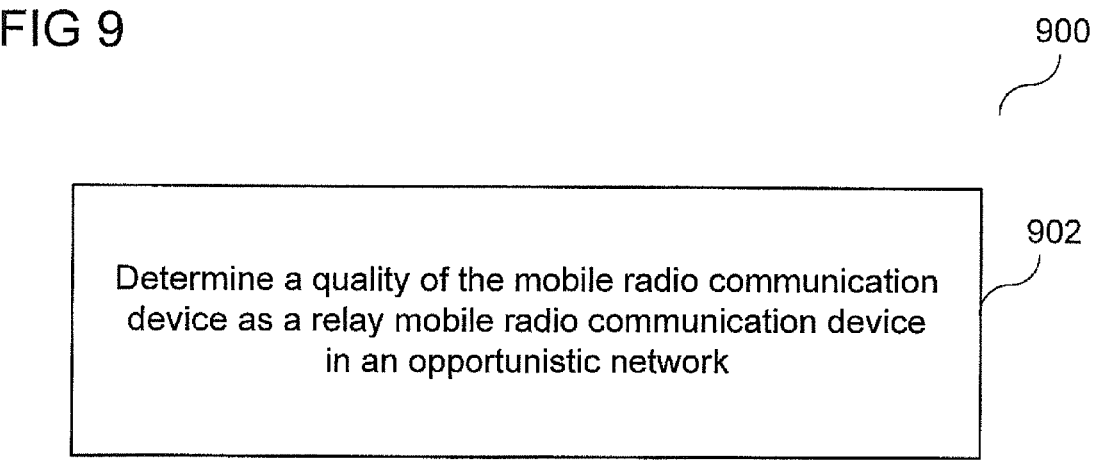
FIG. 9 shows a flow diagram illustrating a method for controlling a mobile radio communication device in accordance with an embodiment.

FIG. 9 shows a flow diagram 900 illustrating a method for controlling a mobile radio communication device in accordance with an embodiment. In 902, a quality of the mobile radio communication device as a relay mobile radio communication device in an opportunistic network may be determined.

Figure 10:
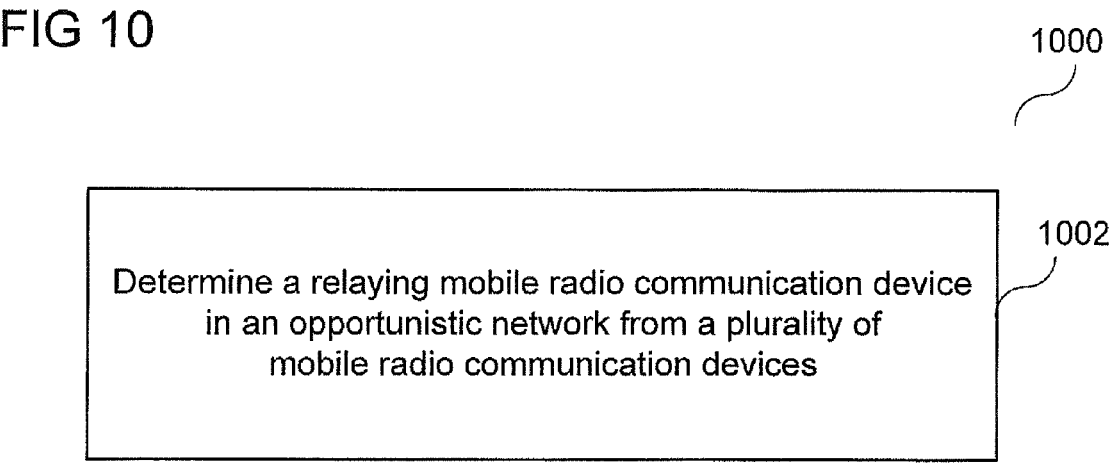
FIG. 10 shows a flow diagram illustrating a method for controlling a mobile radio communication network device in accordance with an embodiment.

FIG. 10 shows a flow diagram 1000 illustrating a method for controlling a mobile radio communication network device in accordance with an embodiment. In 1002, a relaying mobile radio communication device in an opportunistic network may be determined from a plurality of mobile radio communication devices.

According to various embodiments, a method for re-selecting a relaying mobile radio communication device (for example a relaying-UE) during operation may be provided.

According to various embodiments, mobile radio communication devices, for example mobile terminals (for example UEs), may be equipped with multiple radio access technologies (RATs). Cellular technologies may be used to connect permanently to a cellular network, e.g. GSM, UMTS, LTE, and short range technologies may be designed to get sporadically access, e.g. Bluetooth and WiFi (e.g. IEEE 802.11). For example, mobile phones may be equipped with cellular and short range transmitters.

According to various embodiments, cellular networks may provide good coverage and availability with seamless mobility, and the variety of types of offered services on the one hand, but the expensive and limited licensed spectrum used for the air interface on the other hand. In other words, cellular techniques may provide seamless access to the network but usage may be expensive.

According to various embodiments, in contrast to this, short range technologies may be used in the unlicensed bands which may be free of charge and may offer more bandwidth and more throughput per user, for example the ISM (Industrial Scientific Medical) band. According to various embodiments, the coverage area of short range technologies may be small (for example less than 100 m) and mobility between different access points may not be offered, because most of them may not be operated by the same operator but by different private individuals. In other words, short range techniques may provide large data rates at low costs, but seamless mobility may not be supported.

Both technologies have different properties. According to various embodiments, properties of both technologies may be combined to provide cellular services via license free spectrum. According to various embodiments, this may be provided by "opportunistic networks" (ON).

Figure 11:
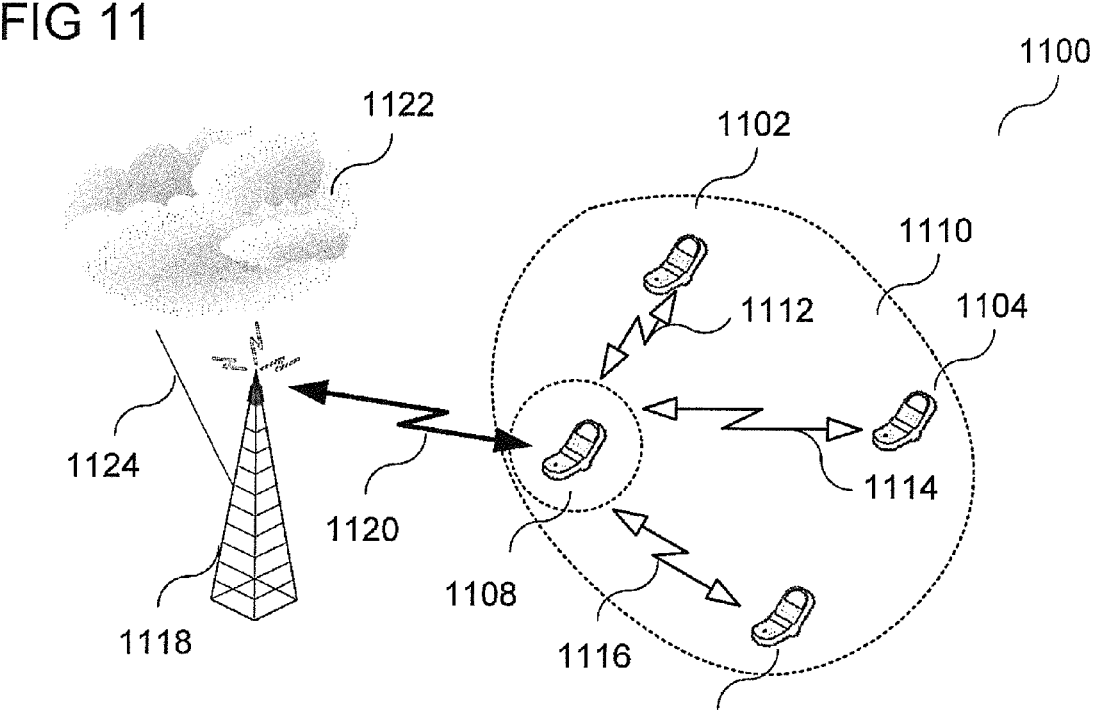
FIG. 11 shows a mobile radio communication system in accordance with an embodiment.

FIG. 11 shows a mobile radio communication system 1100 in accordance with an embodiment. In the ON architecture shown in FIG. 11, the mobile radio communication system 1100 may include an opportunistic network 1110, wherein mobile terminals (for example a first mobile radio communication device 1102, which may also be referred to as ON terminal #1, a second mobile radio communication device 1104, which may also be referred to as ON terminal #2, and a third mobile radio communication device 1106, which may also be referred to a ON terminal #3) may use short range RAT (for example a short range radio link like WiFi) to connect to a special UE called "Relaying-UE", for example a fourth mobile radio communication device 1108, which may be a relaying mobile radio communication device. The Relaying-UE 1108 may be connected with the cellular network via cellular RAT (for example a cellular radio link like LTE) like indicated by arrow 1120 and with one or a plurality of mobile terminals (ON terminals) via short range RAT (for example with the first mobile radio communication device 1102, like indicated by a first arrow 1112, with the second mobile radio communication device 1104, like indicated by a second arrow 1114, and with the third mobile radio communication device 1106, like indicated by a third arrow 1116). The relaying mobile radio communication device 1108 may forward the data between the ON terminals and the cellular network. Thus, the ON terminals may use the unlicensed band to obtain services from the cellular network. The relaying mobile radio communication device 1108 may communicate with a mobile radio base station 1118, for example an eNB. The mobile radio base station may be connected via a line 1124 with a core network 1122.

According to various embodiments, the expensive resources from the licensed spectrum may be used more efficiently. The users of the ON terminals may access the services from the cellular network with larger data rates and lower costs.

According to various embodiments, devices and methods may be provided for selecting a relaying-UE, for example for finding a mobile terminal that is able and suitable to connect to a cellular network and to offer cellular services to other mobile devices via a short range radio link.

According to various embodiments, the Relaying UE 1108 may connect towards other terminals (in other words: other mobile radio communication devices) via short range and may forwards the bundled data from all other terminals towards the core network 1122 via the cellular air interface 1120.

According to various embodiments, devices and methods may be provided for detecting mobile terminals that are suitable to be used as relaying UE, for maintaining a list of suitable relaying UEs and for selecting a new Relaying-UE in case the formerly Relaying-UE stops operation unintentionally or another UE is better suitable as relaying UE.

According to various embodiments, the eNB and the core network may detect whether a UE is capable to operate as relaying-UE. All UEs of an ON that are capable to operate as Relaying-UE may perform measurements of the cellular interface and the short range interface and may provide additional parameters that may be useful for selecting the best suitable Relaying-UE. For example, one or more of the following parameters may be provided by the UEs:
Radio Link Quality between UE and eNB (for example data rate, quality of service (QoS), RX-Level (reception level));
Radio Link Quality between UE and Relaying-UE (e.g. data rate, QoS, RX-Level);
Mobility of UE, for example speed and direction of movement;
Remaining battery power; and
Existence of operator hardware-certification (for example high-end capability of cellular and short range modem, secure and unaltered hardware).

According to various embodiments, the UE that is currently operating as relaying-UE may collect parameters from the UEs and may calculate a "Relaying-UE suitability metric" from the received parameters for each UE. It may send only the calculated metrics to the eNB. This may provide that signaling over the cellular air interface is reduced and the eNB and the core network may be prevented from performing required calculations and may provide a single parameter per UE taking part in the ON to easily and reliably decide about which UE provides the best suitability as Relaying-UE.

According to various embodiments, a "Relaying-UE suitability metric" may be calculated by the eNB or another core network entity. This may provide that the calculation effort in the Relaying-UE is reduced and therefore battery power may be saved According to various embodiments, an "ON Reliability Metric" may be calculated by the Relaying-UE from the previously calculated "Relaying-UE suitability metrics". This value may be broadcasted by the Relaying-UE via short range technology and may be used by UEs to decide whether to connect to the ON.

According to various embodiments, the core network and the eNBs may verify the hardware-certification of an UE to operate as relaying-UE and may verify the existence of a subscription to operate as relaying-UE. Based on this information, they may decide to include a UE in the process of monitoring the relaying-UE suitability. Further they may decide based on the received metrics which UE should operate as relaying-UE and may command UEs to start or to stop operating as Relaying-UE depending on the decision.

According to various embodiments, a reliable mechanism to re-select a relaying-UE may be provided at least in the following two cases:

1. During normal operation; for example the relaying-UE may still be able to offer the service but due to mobility or due to declining battery power another UE may be better suited. Nevertheless frequent re-selections (which may also be referred to as ping-pong effect) may be avoided according to various embodiments;

2. In case the Relaying-UE is moving out of coverage area of the connected UEs or of the eNB and suddenly lost connections.

According to various embodiments, the reliability may be provided by maintaining a list with UEs that may be currently suitable as Relaying-UEs within a mobile radio communication network device, for example an eNB or an entity within the core network, and by keeping such list up to date. Therefore the core network may re-select the Relaying-UE before a connection will get lost due to UEs mobility or to command an alternative UE to operate as Relaying-UE in case the current Relaying-UE unintentionally stops operation.

According to various embodiments, the cellular air interface may be used efficiently, and the users of ON terminals may rely on the connection quality and may obtain high bandwidth at low costs. According to various embodiments, a user of a Relaying-UE may get an incentive from the cellular operator when providing cellular services to other users via the short range interface.

According to various embodiments, devices and methods may be provided for detect UEs that may be capable of operating as Relaying-UE and to provide an eNB or a network entity with (for example a reduced set of) parameters to easily and reliably select a Relaying-UE. This list may always be up-to-date due to periodical measurements and reports by the UEs and by periodical calculations and reports by the current Relaying-UE. Various embodiments for measurements, calculations, and reporting for (or of) this ON reliability feature may be provided. For example, the time intervals for periodical measurements, periodical calculations, and periodical reporting may be conveyed from the core network via the eNB to the UEs forming the ON.

According to various embodiments, UEs may be detected as being capable to operate as Relaying-UE and instructed to perform the measurements and reporting, if relaying-UE capability is detected.

According to various embodiments, the active relaying-UE may collect the parameters from the other UEs, may calculate a single "Relaying-UE suitability metric" for each UE and may transmit the metrics to the eNB.

According to various embodiments, the eNB may be responsible for re-selecting a Relaying-UE. Therefore it may maintain a sorted list of Relaying-UE suitability metrics.

According to various embodiments, the detection whether a UE is capable of operating as Relaying-UE may take place after a UE connects to an ON to obtain cellular-based services.

According to various embodiments, the re-selection may take place in case the "Relaying-UE suitability metric" of any UE of the ON calculated by the current Relaying-UE becomes better than the metric of the current Relaying-UE. This may provide that always a suitable Relaying-UE is used and may avoid the operation of relaying-UEs with bad conditions.

According to various embodiments, the re-selection may take place in case the Relaying-UE unintentionally stops operation. This may avoid that all ON terminals will lose the connection in case the Relaying-UE stops the service and start a RACH (radio access channel) procedure in the macro cell. For this, the information (for example a ranking) about the fall back UEs may be stored and maintained (for example the second best Relaying-Node (in other words: relaying mobile radio communication device), the third best Relaying-Node, and so on) in the ON.

According to various embodiments, the Relaying-UE may calculate information indicating an opportunistic network quality (for example an ON Reliability Metric) from previously calculated information indicating a quality of relaying (for example Relaying-UE suitability metrics or radio link quality between UE and eNB (for example data rate, quality of service (QoS), RX-Level (reception level)), radio link quality between UE and Relaying-UE (e.g. data rate, QoS, RX-Level), mobility of UE, (for example speed and direction of movement), remaining battery power, and/or existence of operator hardware-certification (for example high-end capability of cellular and short range modem, secure and unaltered hardware)). This Metric may be transmitted via short range communication to UEs in the coverage area of the Relaying-UE and may be taken into account by the UEs for ON selection.

According to various embodiments, and without loss of generality, a cellular communication system compliant to 3GPP's Rel. 8 may be assumed including mobile stations (for example UEs), base stations (for example eNBs) and a core network. Further the UEs may be equipped with a short range transmission module according to IEEE 802.11n. In case an UE offers access to the core network via a short range technology, it may be called "Relaying-UE". In case UEs are connected via short range technology with a Relaying-UE, they may be called "ON-Terminals". It may be assumed, that a plurality, for example three, ON-Terminals are connected to a Relaying-UE. For example, the ON-Terminals may be moving to the left whereas the relaying-UE moves to the right. This is shown in FIG. 12.

Figure 12:
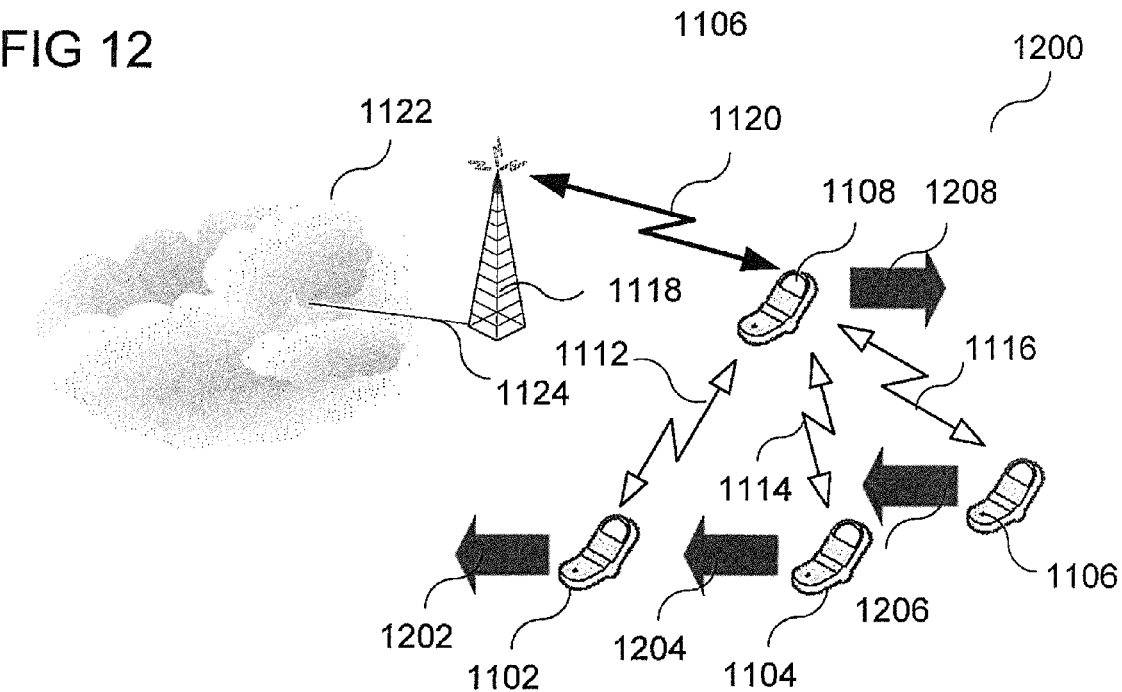
FIG. 12 shows a mobile radio communication system in accordance with an embodiment.

FIG. 12 shows a mobile radio communication system 1200 in accordance with an embodiment. Various components of the mobile radio communication system 1200 may be identical or similar to the mobile radio communication system 1100 shown in FIG. 11; for these components, the same reference signs may be used and duplicate description may be omitted. For example, the first mobile radio communication device 1102 may move to the left, like indicated by a first moving direction arrow 1202. For example, the second mobile radio communication device 1104 may move to the left, like indicated by a second moving direction arrow 1204. For example, the third mobile radio communication device 1106 may move to the left, like indicated by a third moving direction arrow 1206. For example, the fourth mobile radio communication device 1108, which may be a relaying mobile radio communication device, may move to the right, like indicated by a fourth moving direction arrow 1208.

According to various embodiments, devices and methods may be provided for monitoring Relaying-UE suitability of a UE (in other words for enabling an UE for monitoring Relaying-UE suitability).

According to various embodiments, it may be assumed that the first mobile radio communication device 1102 shown in FIG. 12 has just established a connection towards the Relaying-UE 1108 to use services from the core network 1122. The first mobile radio communication device 1102 may also be capable to operate as Relaying-UE, for example the hardware may be certified as being capable and a subscription for Relaying-UE operation may be available at the core network. For example, up to now, the eNB 1118 may not be aware of the Relaying-UE capability of the first mobile radio communication device 1102.

Figure 13:
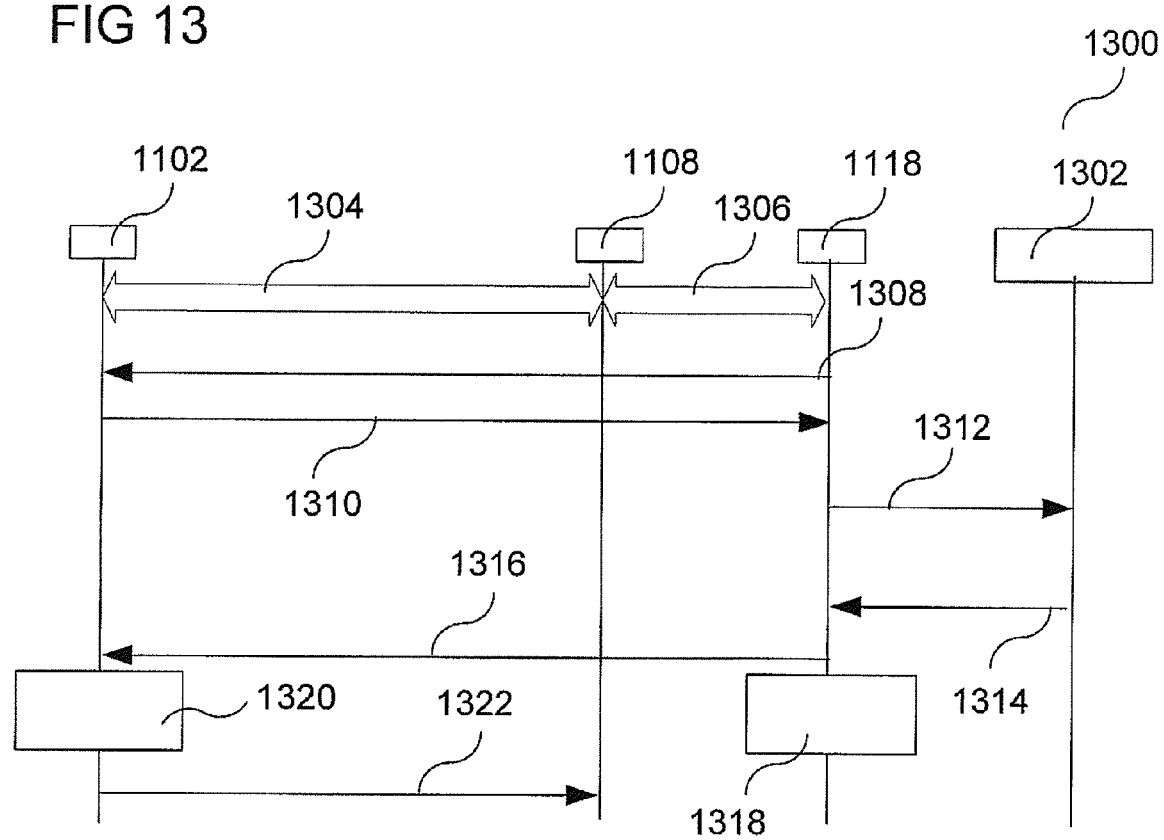
FIG. 13 shows a flow diagram illustrating methods for controlling mobile radio communication devices and a method for controlling a mobile radio communication network device in accordance with an embodiment.

FIG. 13 shows a flow diagram 1300 illustrating methods for controlling mobile radio communication devices and a method for controlling a mobile radio communication network device in accordance with an embodiment.

In the flow diagram 1300, a method for including an UE in the list of suitable Relaying-UEs may be illustrated.

The first mobile radio communication device 1102 may have established a connection 1304 to the Relaying-UE (the fourth mobile radio communication device 1108) to obtain services from the core network 1302, for example via the base station 1118, like indicated by arrow 1306. The eNB 1118 may desire to know whether the first mobile radio communication device 1102 is capable for operating as Relaying-UE. Thus, it may send a Relaying-UE capability request 1308 to the first mobile radio communication device 1102. It will be understood that this request may be sent via the eNB 1118 directly using a cellular communication link, or via the eNB 1118 and the relaying UE 1108 using the cellular communication link to the relaying UE 1108 and a short range link from the relaying UE 1108. The first mobile radio communication device 1102 may respond to the message 1304 and may provide its Relaying-UE capability in a relaying UE capability response 1310. It will be understood that this response may be sent via the eNB 1118 directly, or via the relaying UE 1108. The eNB 1118 may request from a device 1302 in the core network (for example from an HLR (Home Location Register)) whether a subscription to operate as Relaying-UE exists for the first mobile radio communication device 1102 in a relaying-UE subscription request 1312. The core network device 1302 may acknowledge the request to the eNB in a relaying-UE subscription response 1314. The eNB 1118 may include the first mobile radio communication device 1102 in the process to monitor the Relaying-UE suitability. In 1316, it may command the first mobile radio communication device 1102 to start Relaying-UE measurement and reporting by a relaying-UE measurement and reporting command, and in 1318, it may add an entry for UE1 to the list of "UE-suitability metrics". Details about the method and the metric list will be described further below. In 1320, the first mobile radio communication device 1102 may start to perform measurements and in 1320, it may report the results to the eNB by a measurement report. Details about the method will be described further below.

In the following, devices and methods for re-selection of Relaying-UE during normal operation will be described.

Figure 14:
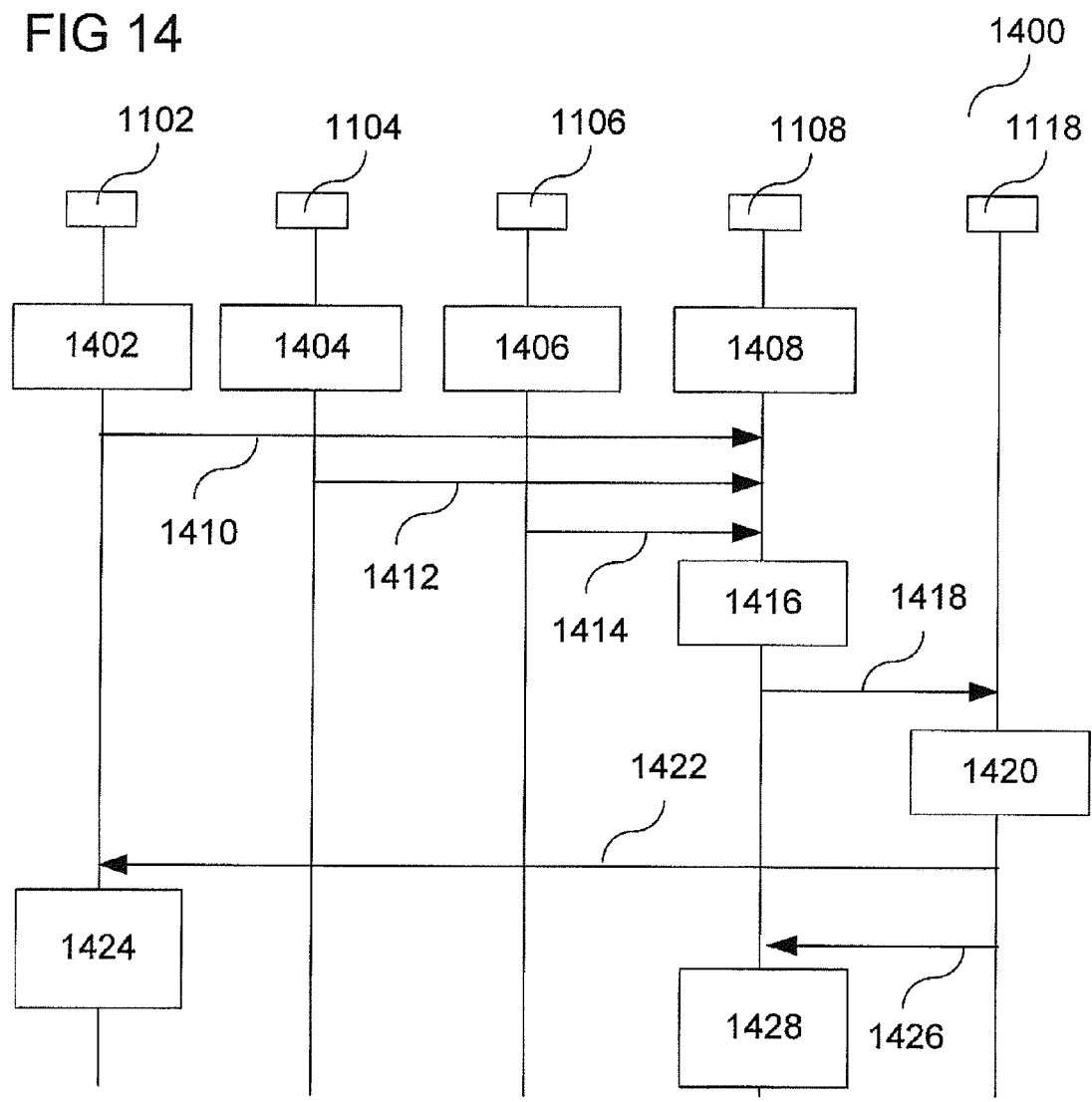
FIG. 14 shows a flow diagram illustrating methods for controlling mobile radio communication devices and a method for controlling a mobile radio communication network device in accordance with an embodiment.

FIG. 14 shows a flow diagram 1400 illustrating methods for controlling mobile radio communication devices and a method for controlling a mobile radio communication network device in accordance with an embodiment. In the message flow of FIG. 14, the first mobile radio communication device 1102 may perform measurements in 1402, the second mobile radio communication device 1104 may perform measurements in 1404, the third mobile radio communication device 1106 may perform measurements in 1406, and the fourth mobile radio communication device 1108 may perform measurements in 1408.

According to various embodiments, each of the mobile radio communication devices may derive:
- the received signal power of the cellular interface from the eNB ($P_{eNB}$);
- the received signal power from each UE of the short range interface ($P_{UE}$);
- their own speed (v) including direction of movement (i.e. v is a vector).

Each UE may count the number of UEs ($N_{UE}$) for which the measured $P_{UE}$ is above a threshold and may derive the remaining battery capacity C.

According to various embodiments, the first mobile radio communication device 1102 may transmit its measurement report in 1410, for example to the fourth mobile radio communication device 1108; the second mobile radio communication device 1104 may transmit its measurement report in 1412, for example to the fourth mobile radio communication device 1108; and the third mobile radio communication device 1106 may transmit its measurement report in 1414, for example to the fourth mobile radio communication device 1108.

According to various embodiments, each mobile radio communication device may transmit $P_{eNB}$, $N_{UE}$, v and C to the Relaying-UE 1108.

In 1416, the relaying-UE 1108 may calculate the resulting speed $v_{res}$=v1+v2+v3+v4 and after that may calculate for each UE a "Relaying-UE suitability metric" with the formula:

$$M=(c_1*(P_{eNB}-n_1)+c_2*N_{UE}/n_2+c_3*\|(v-v_{res})\|/n_3+c_4*C/n_4),$$

where $\|x\|$ may be the absolute value of a vector "x". The parameters $c_i$ and $n_i$ may have been signaled previously by the eNB to the relaying-UE. The values for n may be selected in a way, that acceptable measured values lead to normalized values around 1, for example, if $N_{UE}$=3 is acceptable, $n_2$ may be selected as 3 so that $N_{UE}/n_2$=1 in case $N_{UE}$=3 was received. For parameters measured in dB (which may be done for received signal levels) the normalization may be done by subtracting a normalization value, for example if $P_{eNB}$=−60 dBm is acceptable, $n_1$ may be selected as −60 dBm and the normalization may lead to $P_{eNB}-n_1$=0 in case $P_{eNB}$=−60 dBm was measured.

According to various embodiments, the parameters $c_i$ may be selected as "+1" if the relating parameter is to be weighted neutrally, between 0 and +1 if the relating parameter is of less importance and larger than +1 if the relating parameter is of higher importance. In case that increasing values of the parameter leads to better suitability, for example as for $P_{eNB}$, $N_{UE}$ or C, the weighting factor may be positive. In case it leads to worse suitability, e.g. for $\|(v-v_{res})\|$ because a higher value means that the UE may depart from the rest of the UEs, the factor may be selected negative.

In 1418, the Relaying-UE 1108 may transmit a Metric Report to the eNB 1118, in which the IDs of the UEs (e.g. IMSI (International Mobile Subscriber Identity) or MSISDN (Mobile Station Integrated Services Digital Network Number)) and four Metrics may be included (for example M1 from the first mobile radio communication device 1102 to M4 from the fourth mobile radio communication device 1108).

According to various embodiments, the eNB 1118 may maintain for each ON a list with Relaying-UE suitability metrics. Each time new metrics are received, the metrics may be updated with the new values. Afterwards the list may be sorted to decreasing metric values, for example the upper most entry may be from the UE with the largest Relaying-UE suitability metric and therefore this UE may currently be the best choice for acting as Relaying-UE. It may be assumed that the previous Metric Report has indicated the fourth mobile radio communication device 1108 as being the best suitable Relaying-UE (see Table 1). It may have moved into the same direction as the first mobile radio communication device 1102, the second mobile radio communication device 1104, and the third mobile radio communication device 1106 (for example to the left in FIG. 12) and may have been closest to the eNB 1118. Therefore, the Metric $M_4$ may have been the largest metric. After the previous measurement, the fourth mobile radio communication device 1108 may have changed its movement direction. Now it may move to the right. Therefore $P_{eNB}$ may decrease and $\|(v-v_{res})\|$ may increase. This may lead to a much smaller metric. The current Metric Report may indicate the first mobile radio communication device 1102 as being the best suitable Relaying-UE (see Table 2). Therefore, the eNB 1118 may decide to select the first mobile radio communication device 1102 to operate as Relaying-UE. According to various embodiments, to avoid that such re-selection of Relaying-UE occurs to frequently (which may be referred to as ping-pong effect), the metric of the current Relaying-UE may be increased about a pre-determined hysteresis value "h", for example about "2". According to various embodiments, only if the increased metric is smaller than any other metric, the eNB may decide to select a new Relaying-UE. In this example, $M_1$ may be larger than $M_4$+h, and therefore the eNB 1118 may, in 1420, select the first mobile radio communication device 1102 to be a new Relaying-UE.

TABLE 1

Metric list after previous Metric Report

| Rank | UE-ID | Relaying UE suitability metric |
|---|---|---|
| 1 | UE4 | 10.0 |
| 2 | UE1 | 8.5 |
| 3 | UE2 | 7.3 |
| 4 | UE3 | 6.2 |

TABLE 2

Metric list after current Metric Report

| Rank | UE-ID | Relaying UE suitability metric |
|---|---|---|
| 1 | UE1 | $M_1$ = 11.0 |
| 2 | UE4 | $M_4$ = 8.8 |
| 3 | UE2 | $M_2$ = 7.9 |
| 4 | UE3 | $M_3$ = 6.8 |

In 1422, the eNB 1118 may command the first mobile radio communication device 1102 to start operating as Relaying-UE. In 1426, the eNB 1118 may command the fourth mobile radio communication device 1108 to stop operating as Relaying-UE. In 1424, the first mobile radio communication device 1102 may start to operate as Relaying-UE; for example it may broadcast its presence and properties via short range, may allow UEs to connect via the short range interface and may forward data received via short range communication to the core network via cellular radio interface for the uplink (and vice versa for the downlink). In 1428, the fourth mobile radio communication device 1108 may stop to operate as Relaying-UE.

According to various embodiments, due to performing calculations in the Relaying-UE, only little signaling is to be transmitted over the cellular air interface.

According to various embodiments, some or all described calculations may be performed by the eNB or by other core network entities. The basic steps may be the same as described above, and additionally the parameters needed for calculation may be forwarded by the Relaying-UE to the entity that performs the calculation. This may reduce the calculation effort in the Relaying-UE and may save battery power.

According to various embodiments, eNB-driven re-selection of Relaying-UE after unintended stop of operation may be provided, for example like described with reference to FIG. 15 below.

Figure 15:
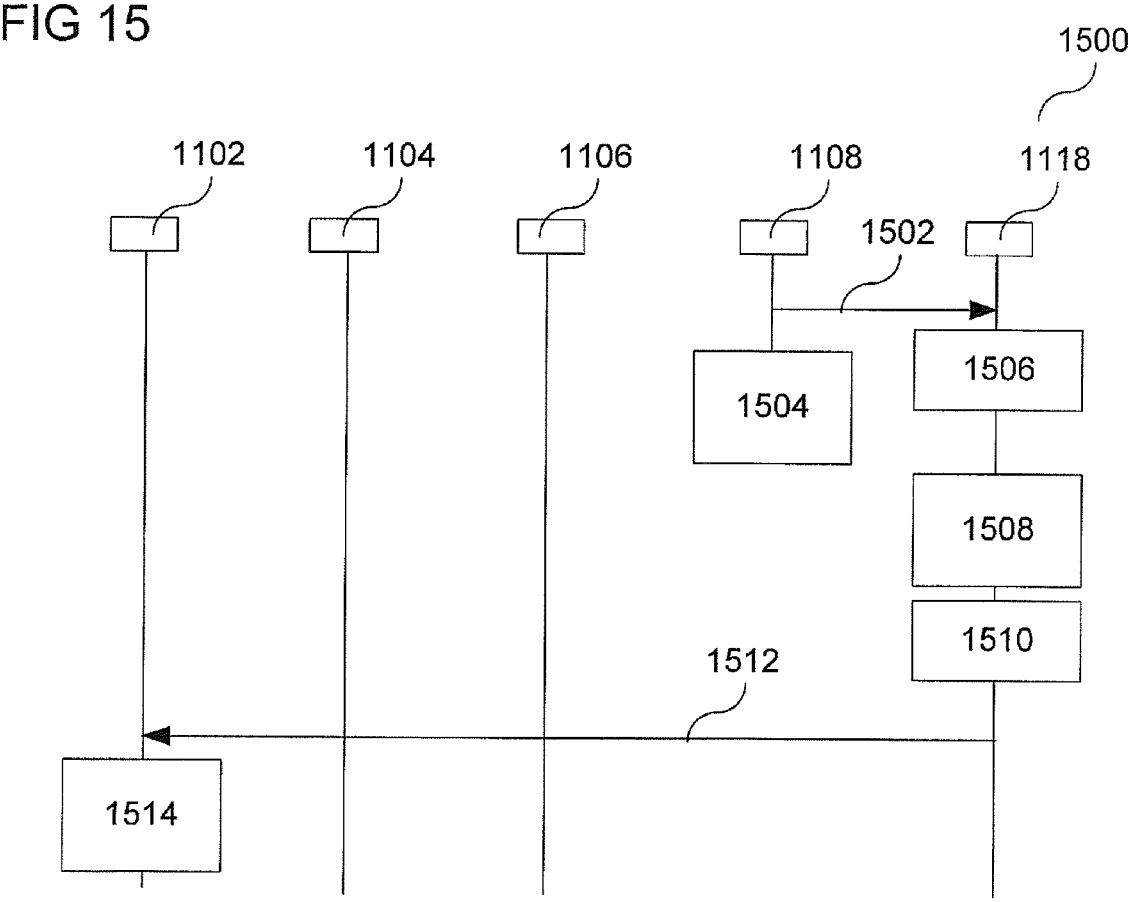
FIG. 15 shows a flow diagram illustrating methods for controlling mobile radio communication devices and a method for controlling a mobile radio communication network device in accordance with an embodiment.

FIG. 15 shows a flow diagram 1500 illustrating methods for controlling mobile radio communication devices and a method for controlling a mobile radio communication network device in accordance with an embodiment.

The mobile radio communication system 1200 shown in FIG. 12 may be considered. During normal operation, the Relaying-UE (the fourth mobile radio communication device 1108) may suddenly have lost connection to the eNB 1118, which may not be re-established. For example, the fourth mobile radio communication device 1108 may enter a tunnel without cellular network coverage. According to various embodiments, devices and methods may be provided to detect the stop of operation and to command another UE to overtake the role of relaying-UE.

The fourth mobile radio communication device 1108 may be in normal Relaying-UE operation. In 1502, it may transmit a Metric Report like described above to the eNB 1118. In 1506, the eNB 1118 may update the list with the metrics. The fourth mobile radio communication device 1108 may still be the UE with the largest metric. It may start a timer T after reception of the metric report.

In 1504, the fourth mobile radio communication device 1108 may enter a tunnel and therefore the connection towards the eNB 1118 may brake down.

The timer T may expire without reception of a new metric report. Therefore, in 1508, the eNB 1118 may detect that the fourth mobile radio communication device 1108 unintentionally stops operation which may trigger the eNB 1118 to select a new relaying-UE in 1510.

It will be understood that measuring a timer is one option of determining whether the presently relaying UE is still operating, but any other method may be used, for example actively pinging the presently relaying UE.

In 1510, the eNB 1118 may remove the entry of the fourth mobile radio communication device 1108 in the metric list and may select the UE with largest metric as new Relaying-UE. It may be assumed that the first mobile radio communication device 1102 was selected.

In 1512, the eNB 1118 may command the first mobile radio communication device 1102 to start operating as Relaying-UE. In 1514, the first mobile radio communication device 1102 may start to operate as Relaying-UE; for example, it may broadcast its presence and properties via short range, may allow UEs to connect via the short range interface and may forward data received via short range communication to the core network via cellular radio interface for the uplink and vice versa for the downlink.

According to various embodiments, devices and methods may be provided for UE-driven re-selection of Relaying-UE after unintended stop of operation, like will be described with reference to FIG. 16 below.

Figure 16:
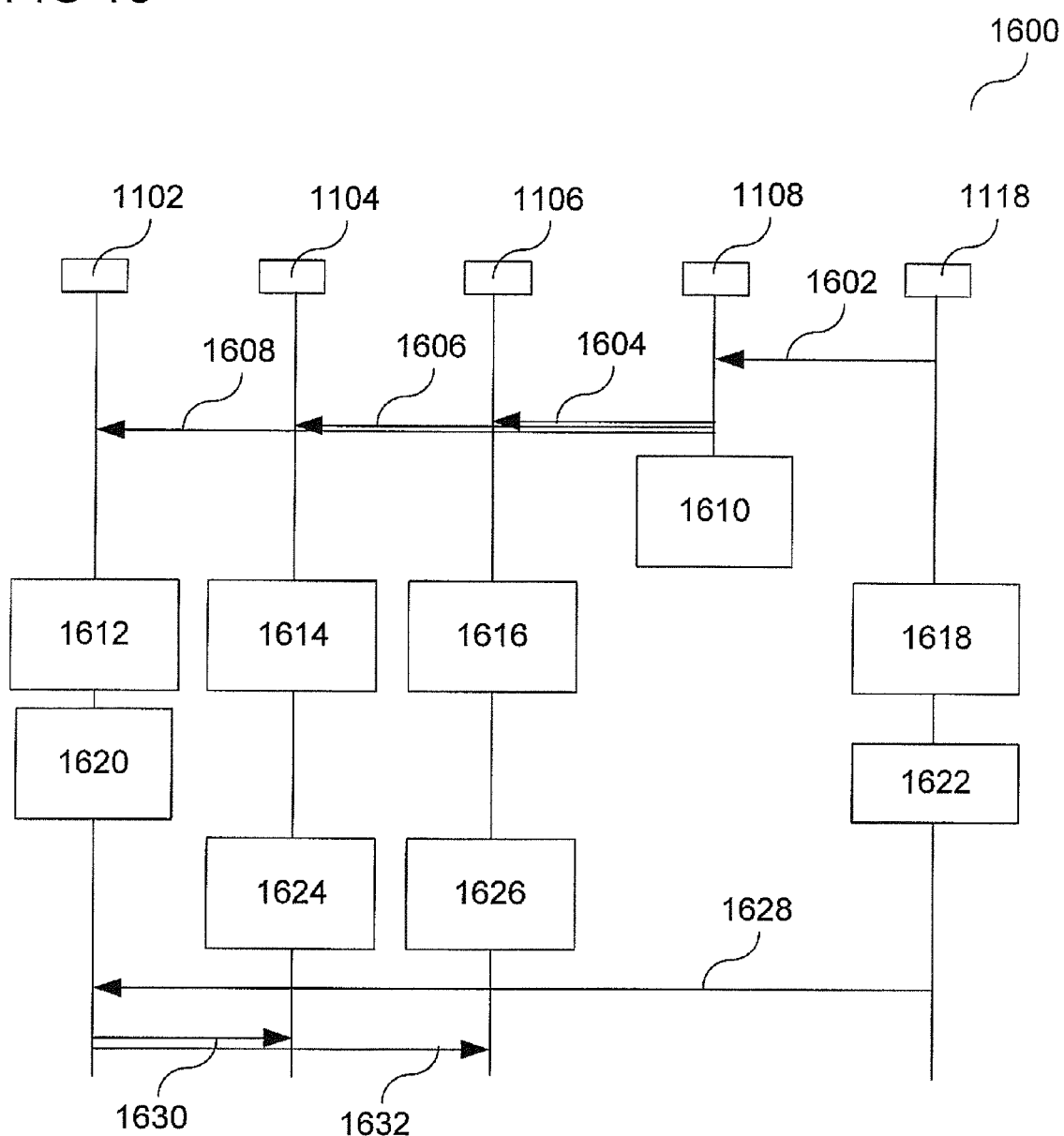
FIG. 16 shows a flow diagram illustrating methods for controlling mobile radio communication devices and a method for controlling a mobile radio communication network device in accordance with an embodiment.

FIG. 16 shows a flow diagram 1600 illustrating methods for controlling mobile radio communication devices and a method for controlling a mobile radio communication network device in accordance with an embodiment.

The mobile radio communication system 1200 shown in FIG. 12 may be considered. During normal operation, the Relaying-UE (the fourth mobile radio communication device 1108) may suddenly have lost connection to the eNB 1118, which may not be re-established. For example, the fourth mobile radio communication device 1108 may enter a tunnel without cellular network coverage. It may further be assumed, that the suitability metrics of the first mobile radio communication device 1102, the second mobile radio communication device 1104, and the third mobile radio communication device 1106 may not change during this procedure. According to various embodiments, devices and methods may be provided to broadcast the ranking of the suitable Relaying-UEs, to detect an unintended stop of operation and to quickly establish an ON by another UE.

In 1602, The eNB 1118 may transmit a list of the best suited Relaying-UEs to the currently acting Relaying-UE (for example the fourth mobile radio communication device 1108). Rank 2 and rank 3 may be transmitted, for example the first mobile radio communication device 1102 and the second mobile radio communication device 1104, assuming the metric list of Table 1. Rank 1 may not be included as this may always be the currently acting Relaying-UE that is known to every UE of the ON. This may be done every time the metric list has changed after it was updated.

According to various embodiments, the Relaying-UE 1108 may transmit the list with the best suited Relaying-UEs to the connected UEs, for example to the first mobile radio communication device 1102 in 1608, to the second mobile radio communication device 1104 in 1606, and to the third mobile radio communication device 1106 in 1604. This may be done dedicated every time the metric list has changed or broadcasted periodically.

In 1610, the fourth mobile radio communication device 1108 may stop operating as Relaying-UE. In 1618, the eNB 1118 may detect that the fourth mobile radio communication device 1108 unintentionally stopped the operation because timer T expires without reception of a new metric report. Therefore it may decide to perform a Relaying-UE reselection in 1622. According to various embodiments, the eNB 1118 may remove the fourth mobile radio communication device 1108 from the metric list. The rank of the remaining UEs in the list may be reduced by 1, for example the first mobile radio communication device 1102 may now have rank 1 (based on Table 1) and therefore may be the new Relaying-UE. The eNB 1118 may prepare for establishment of a connection towards a new relaying-UE.

In 1612, the first mobile radio communication device 1102 may detect that the fourth mobile radio communication device 1108 unintentionally stopped the operation as neither broadcasted signals from the fourth mobile radio communication device 1108 nor dedicated signals are received anymore. Therefore, the first mobile radio communication device 1102 may read the list received and stored after reception of the data in 1608, which may indicate that the first mobile radio communication device 1102 is now the best suited Relaying-UE. Therefore, the first mobile radio communication device 1102 may start to operate as relaying-UE in 1620, for example may establish the connection towards the eNB 1118 and may starts to broadcast signals (for example SSID (Service Set Identifier) and ON advertisement information) via the short range interface to show its availability to the other UEs.

In 1614, the second mobile radio communication device 1104, and in 1616, the third mobile radio communication device 1106 may detect that the fourth mobile radio communication device 1108 unintentionally stopped the operation and may read the list received and stored after reception of the data in 1606 and 1604. As the first mobile radio communication device 1102 is indicated to be now the best suited Relaying-UE, the second mobile radio communication device 1104 in 1624 and the third mobile radio communication device 1106 in 1626 may start to establish a connection towards the first mobile radio communication device 1102.

In 1627, the eNB 1118 may transmit a new list of the best suited Relaying-UEs to the currently acting Relaying-UE (the first mobile radio communication device 1102). Rank 2 and rank 3 may be transmitted, for example the second mobile radio communication device 1104 and the third mobile radio communication device 1106 (assuming the metric list of Table 1).

According to various embodiments, the Relaying-UE (the first mobile radio communication device 1102) may transmit the list with the best suited Relaying-UEs to the connected UEs, for example to the second mobile radio communication device 1104 in 1630 and to the third mobile radio communication device 1106 in 1632.

It will be understood that measuring a timer is one option of determining whether the presently relaying UE is still operating, but any other method may be used, for example actively pinging the presently relaying UE.

According to various embodiments, devices and methods for calculation of ON-reliability may be provided.

Figure 17:
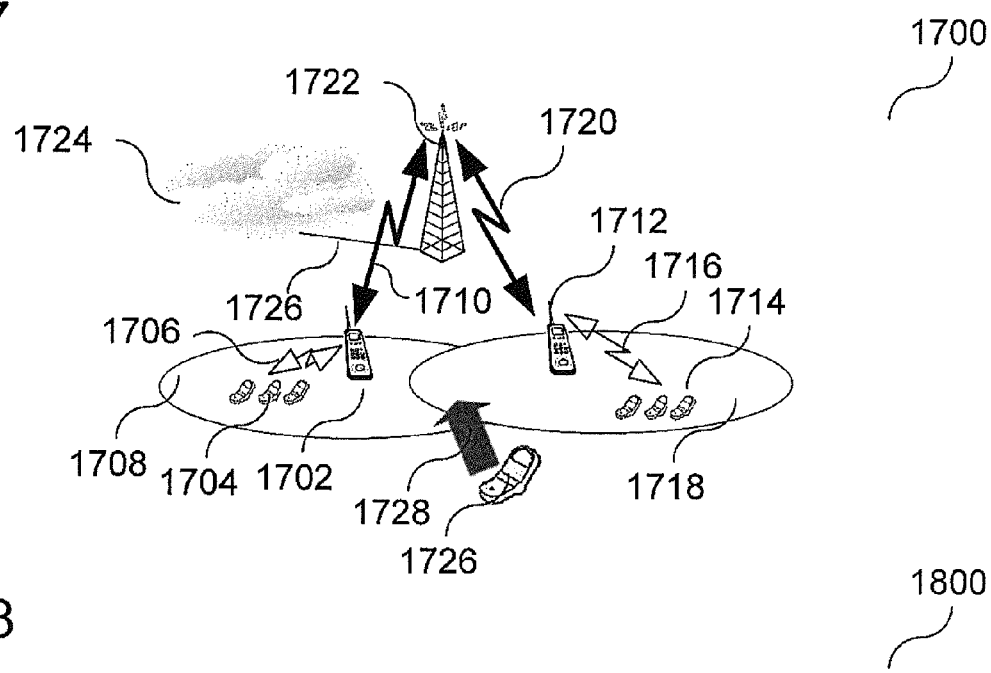
FIG. 17 shows a mobile radio communication system in accordance with an embodiment.

FIG. 17 shows a mobile radio communication system 1700 in accordance with an embodiment.

A first opportunistic network (ON1) 1708 and a second opportunistic network (ON2) 1718 may be operated by an eNB 1722. The first ON 1708 may include a first relaying UE (UE1) 1702, and the second ON 1718 may include a second relaying UE (UE2) 1712. The coverage areas of the first ON 1708 and the second ON 1718 may be overlapping. The first ON 1708 may not be using the methods according to various embodiments, for example, no suitability metric for Relaying-UEs may be calculated. The second ON 1718 may be using the methods described above. A plurality (for example three) of ON-terminals may be using each ON. For example, in the first ON 1708, a first plurality of ON-terminals 1704 may communicate with the first relaying UE 1702, like indicated by a first arrow 1706. For example, in the second ON 1718, a second plurality of ON-terminals 1714 may communicate with the second relaying UE 1712, like indicated by a second arrow 1716. The first relaying UE 1702 may communicate with the mobile radio base station 1722 like indicated by a third arrow 1710. The second relaying UE 1712 may communicate with the mobile radio base station 1722 like indicated by a fourth arrow 1720. The mobile radio base station 1722 may be connected to a core network 1724 by a line 1726.

In an example, a third mobile radio communication device 1726 may enter the coverage areas of both the first ON 1708 and the second ON 1718, like indicated by a fifth arrow 1728. According to various embodiments, the method like described with reference to FIG. 18 may be performed.

Figure 18:
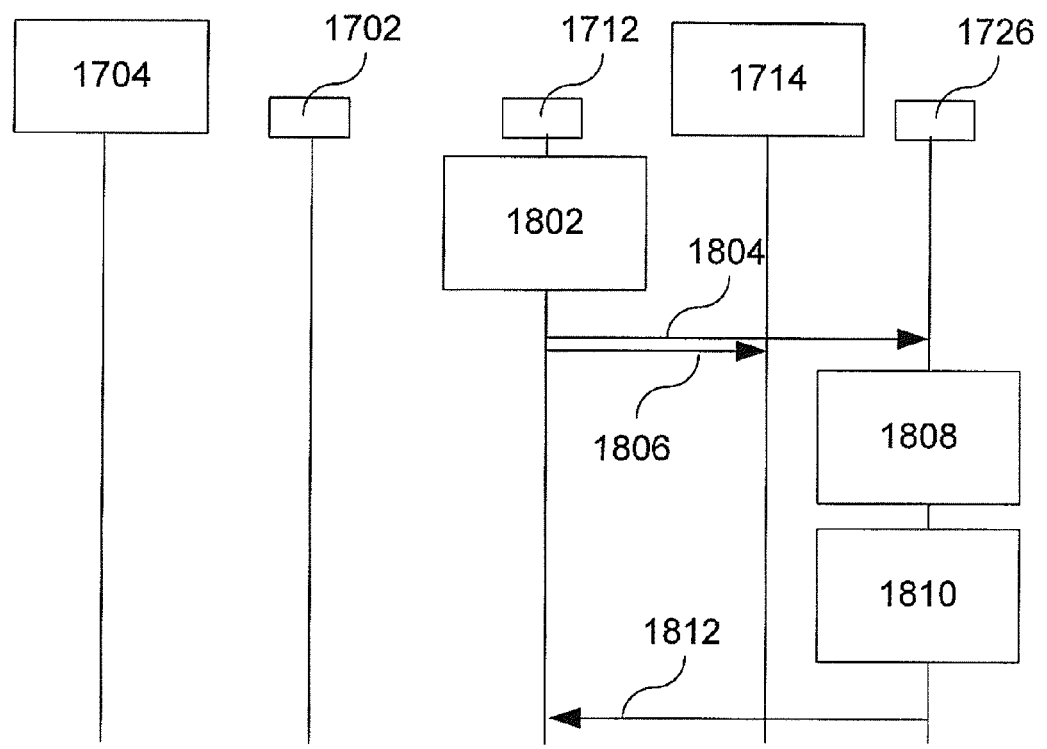
FIG. 18 shows a flow diagram illustrating methods for controlling mobile radio communication devices and a method for controlling a mobile radio communication network device in accordance with an embodiment.

FIG. 18 shows a flow diagram 1800 illustrating methods for controlling mobile radio communication devices and a method for controlling a mobile radio communication network device in accordance with an embodiment.

According to various embodiments, the second relaying mobile radio communication device (UE2) 1712 may use the calculated suitability metrics to calculate an ON Reliability Metric in 1802. It may combine the suitability metrics of a predetermined number (for example three) highest ranked UEs to a new reliability metric with the following formula:

$$M_R = (c_1 * M_1 + c_2 * M_2 + c_3 * M_3),$$

where $M_1$ may be the highest ranked metric, $M_2$ the second highest metric and so on. The parameters $c_i$ may be selected as "+1" if the relating metric is to be weighted neutrally, between 0 and +1 if the relating metric is of less importance and larger than +1 if the relating parameter is of higher importance. In this example the highest ranked metric is to be of highest importance. Therefore the parameters $c_i$ may be selected as follows: $c_1=2$, $c_2=1$, $c_3=0.5$.

According to various embodiments, the reliability metric $M_R$ may be broadcasted periodically via short range technology to all UEs within the coverage area, for example the second plurality of mobile radio communication devices 1714 in 1806 and to the third mobile radio communication device 1726 in 1804.

The third mobile radio communication device 1706 may, in 1808, detect the first ON 1708 and the second ON 1718 and, in 1810, may read their capabilities from the broadcasted signals. From the broadcasted reliability metric, it may determine that the second ON 17182 is offering a high reliability and that the suitability of Relaying-UEs is monitored by the ON. The first ON 1708 may not be offering such reliability as no reliability metric may be broadcasted. Therefore the third mobile radio communication device 1726 may decide to connect to the second ON 1718 in 1812.

According to various embodiments, the capability of an UE to operate as Relaying-UE may be detected by the eNB.

According to various embodiments, the UEs, that are capable to operate as Relaying-UE, may perform measurements of the short range and cellular interface and may report them to the relaying-UE.

According to various embodiments, the Relaying-UE may calculate a single "Relaying-UE suitability metric" for each UE and may transmit the metrics to the eNB.

According to various embodiments, the eNB may maintain a sorted list of Relaying-UE suitability metrics and may be responsible for re-selecting a Relaying-UE. This may be done during normal operation, for example when the Relaying-UE may still be able to offer the service but due to mobility another UE is better suitable and/or in case the Relaying-UE is moving out of coverage area of the connected UEs or of the eNB and suddenly lost connections, for example when the operation is stopped unintentionally.

According to various embodiments, based on the metric list, a list of alternative Relaying-UEs may be transmitted to all UEs of the ON. This list may be used to quickly re-establish the ON in case the Relaying-UE unintentionally stops operation.

According to various embodiments, based on the calculated suitability metrics, a "ON Reliability Metric" may be calculated by the Relaying-UE. This may be used by UEs for ON selection.

According to various embodiments, devices and methods may be provided for a reliable operation of an ON. A suitable UE may used as Relaying-UE. Several UEs may be taken into account for being Relaying-UE as the capability is detected by the eNB. This may provide continually a reliable ON operation with good connection quality.

According to various embodiments, signaling over the cellular air interface may be efficient due to transmission of only one metric per UE. Further calculation effort may not be caused in the eNB.

According to various embodiments, devices and methods may be provided that work reliably even in case the Relaying-UE unintentionally stops operation. This may be provided by placement of the selection function into a fixed element, for example the eNB. A new Relaying-UE may be operated very quickly after such incident occurs as all relevant data may be available at the eNB.

According to various embodiments, the interruption time after a Relaying-UE unintentionally may stop operation until a new Relaying-UE starts operation may be reduced.

According to various embodiments, UEs may take the reliability of an ON into account for before connecting to the ON. Thus, a reliable ON may be used which may enhance the overall user experience.

According to various embodiments, devices and methods to advertise opportunistic networks may be provided.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication device, comprising:
   a wireless local area network (WLAN) communication interface to communicate with a second mobile radio communication device over a WLAN;
   a cellular communication interface to communicate with a mobile radio base station over a cellular network; and
   a relay quality determiner coupled with the WLAN communication interface and the cellular communication interface and to determine a relay metric that indicates a quality of relaying data by the mobile radio communication device between the second mobile radio communication device and the mobile radio base station via the cellular communication interface and the WLAN communication interface, wherein the relay metric is based on a quality of a cellular radio communication associated with the cellular communication interface, a quality of a WLAN radio communication associated with the WLAN communication interface, and a physical velocity of the mobile radio communication device.

2. The mobile radio communication device of claim 1, further comprising:
   an opportunistic network quality receiver coupled with the relay quality determiner and to receive information indicating a respective quality of service of a plurality of opportunistic networks.

3. The mobile radio communication device of claim 2, wherein the relay quality determiner is further to determine the relay metric based on the information indicating a respective quality of service of a plurality of opportunistic networks.

4. The mobile radio communication device of claim 1, wherein the WLAN communication interface is a BlueTooth or WiFi communication interface.

5. The mobile radio communication device of claim 1, wherein the relay metric is a first relay metric associated with the mobile radio communication device, and wherein the relay quality determiner is further to determine a second relay metric that indicates a quality of relaying data by the second mobile radio communication device between the mobile radio base station and the mobile communication device over the WLAN and the cellular network.

6. A mobile radio communication network device, comprising:
   a receiver configured to receive relaying quality information of a first mobile radio communication device and relaying quality information of a second mobile radio communication device, the relaying quality information of the first mobile radio communication device based on a quality of a cellular radio connection of the first mobile radio communication device, a quality of a wireless local area network (WLAN) radio connection of the first mobile radio communication device, and a velocity of the first mobile radio communication device, and the relaying quality information of the second mobile radio communication device based on a quality of a cellular radio connection of the second mobile radio communication device, a quality of a WLAN radio connection of the second mobile radio communication device, and a velocity of the second mobile radio communication device; and
   a relaying mobile radio communication device determiner coupled with the receiver and to determine which one of the first mobile radio communication device and the second mobile radio communication device provides a higher quality of relaying data based on the relaying quality information of the first mobile radio communication device and the relaying quality information of the second mobile radio communication device.

7. The mobile radio communication network device of claim 6, further comprising:
   a relaying mobile radio communication device stopping determiner configured to determine whether a relaying mobile radio communication device stops operation.

8. The mobile radio communication network device of claim 6, further comprising:
   a quality information transmitter configured to transmit information indicating a candidate for a relaying mobile radio communication device to a plurality of mobile radio communication devices based on the determination.

9. The mobile radio communication network device of claim 6, further comprising:
   a relay instructor configured to transmit an instruction to start operating as a relaying mobile radio communication device to a mobile radio communication device, based on the determination.

10. The mobile radio communication network device of claim 6, wherein the WLAN radio connection is a BlueTooth connection or a WiFi connection.

11. The mobile radio communication network device of claim 6, wherein the relaying mobile radio communication device determiner is to determine a first numeric relay metric based on the relaying quality information of the first mobile radio communication device and a second numeric relay metric based on the relaying quality information of the second mobile radio communication device; and
   wherein the relaying mobile radio communication device determiner is to determine which one of the first or second mobile radio communication devices provides a higher quality of relaying data based on the first and second relay metrics.

12. The mobile radio communication network device of claim 6, wherein the relaying quality information of the first mobile radio communication device is a first numeric relay metric, and the relaying quality information of the second mobile radio communication device is a second numeric relay metric; and wherein the relaying mobile radio communication device determiner is to determine which one of the first or second mobile radio communication devices provides a higher quality of relaying data based on the first and second relay metrics.

13. The mobile radio communication network device of claim 6, wherein the relaying quality information of the first mobile radio communication device and the relaying quality information of the second mobile radio communication device are received from the first mobile radio communication device.

14. A method comprising:
    determining, by a first mobile device, a quality of a cellular connection between the first mobile device and a base station over a cellular network;
    determining, by the first mobile device, a quality of a wireless local area network (WLAN) connection between the first mobile device and a second mobile device over a WLAN; and
    determining, by the first mobile device, a relay metric that indicates a quality of relaying data by the first mobile device between the base station and the second mobile device over the cellular connection and the WLAN connection;
    wherein the relay metric is based on the quality of the cellular connection, the quality of the WLAN connection, and a velocity of the first mobile device.

15. The method of claim 14, further comprising:
    receiving, by the first mobile device, information indicating a respective quality of service of a plurality of opportunistic networks.

16. The method of claim 15, further comprising determining, by the first mobile device, the relay metric based on the information indicating a respective quality of service of a plurality of opportunistic networks.

17. The method of claim 14, wherein the WLAN is a BlueTooth network or a WiFi network.

18. The method of claim 14, wherein the relay metric is a first relay metric associated with the first mobile radio communication device, and further comprising determining a second relay metric that indicates a quality of relaying data by the second mobile radio communication device between the base station and the first mobile communication device over the WLAN and the cellular network.

* * * * *